Sept. 14, 1954      J. H. HAMMOND, JR      2,689,083
SUBMARINE ATTACK COMPUTER Filed Nov. 12, 1952      7 Sheets-Sheet 1

INVENTOR.
JOHN HAYS HAMMOND, JR.
BY
atty

Fig. 2.

INVENTOR.
JOHN HAYS HAMMOND, JR.
BY

Sept. 14, 1954   J. H. HAMMOND, JR   2,689,083
SUBMARINE ATTACK COMPUTER
Filed Nov. 12, 1952                         7 Sheets-Sheet 4

*INVENTOR.*
JOHN HAYS HAMMOND, JR.
BY

Sept. 14, 1954  J. H. HAMMOND, JR  2,689,083
SUBMARINE ATTACK COMPUTER

Filed Nov. 12, 1952  7 Sheets-Sheet 5

INVENTOR.
JOHN HAYS HAMMOND, JR.
BY
Atty

Sept. 14, 1954  J. H. HAMMOND, JR  2,689,083
SUBMARINE ATTACK COMPUTER

Filed Nov. 12, 1952  7 Sheets—Sheet 6

Fig. 9.

INVENTOR.
JOHN HAYS HAMMOND, JR.

Sept. 14, 1954  J. H. HAMMOND, JR  2,689,083
SUBMARINE ATTACK COMPUTER
Filed Nov. 12, 1952  7 Sheets-Sheet 7

INVENTOR.
JOHN HAYS HAMMOND, JR.
BY

Patented Sept. 14, 1954

2,689,083

UNITED STATES PATENT OFFICE 2,689,083

SUBMARINE ATTACK COMPUTER

John Hays Hammond, Jr., Gloucester, Mass.

Application November 12, 1952, Serial No. 320,072

3 Claims. (Cl. 235—61.5)

This invention relates to means for locating and attacking a submerged submarine by the use of a surface vessel and an attacking aircraft.

The invention relates more specifically to a method for obtaining the bearing and distance of a submarine by sonar and of an attacking aircraft by radar from a surface ship, the feeding of this information into a calculator on the ship, said calculator giving the relative bearing of said submarine from said aircraft and television means for transmitting this information from said ship to said attacking aircraft.

This invention further provides means for ascertaining the course and speed of the submarine, which together with the speed of the aircraft is fed to the calculator, thus correcting the heading of the aircraft in order to take into account these factors.

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which.

Like reference characters denote like parts in the several figures of the drawing.

In the following description parts will be identified by specific names for convenience, but they are intended to be generic in their application to similar parts.

Figure 1:
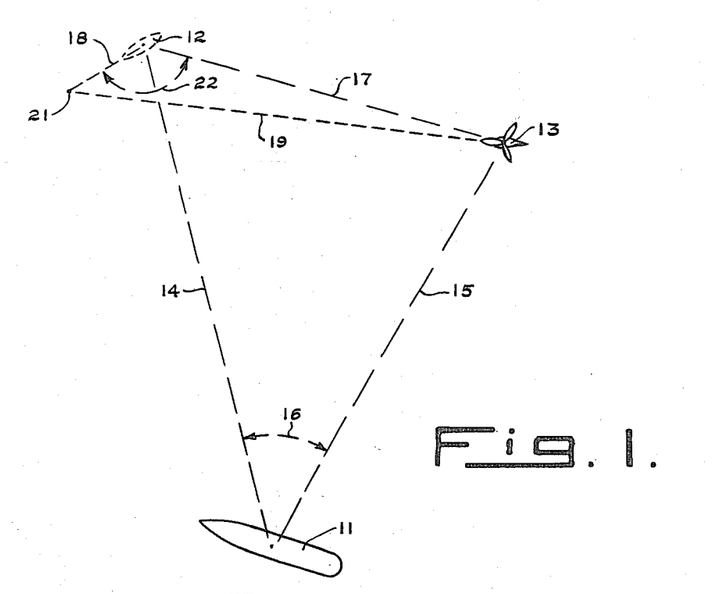
Fig. 1 is a diagram representing the relative locations of the ship, submarine and aircraft.

Referring to Fig. 1 a surface ship is indicated at 11, and enemy submarine at 12 and an attacking helicopter at 13. The problem is to determine the bearings and distances of the submarine 12 and helicopter 13 from the ship 11, the course and speed of the submarine 12, the bearing and distance of the submarine 12 from the helicopter 13 and finally the heading the helicopter 13 must take in order to intercept the submarine 12. By standard and well known methods the distance and direction of the submarine 12 from the ship 11, represented by the line 14, may be determined by sonar and the distance and direction of the helicopter 13 from the ship 11, represented by the line 15, may be determined by radar. By knowing the lengths of the two sides 14 and 15 and the angle 16 between them the triangle 11—12—13 is determined, so that the length and direction of the side 17 is obtained. This gives the distance and bearing of the submarine 12 from the helicopter 13.

Also by well known methods the course and speed of the submarine 12 is ascertained, which is represented by the line 18. As the speed of the helicopter 19 is known the triangle 12—13—21 is determined from the lengths of the two sides 18 and 19 and the angle 22. From this triangle the heading 19 along which the helicopter 13 must fly in order to intercept the submarine 12 at point 21 is determined.

In order to obtain this information the calculator shown in Figs. 2-6 is provided. This calculator consists of a base plate 25 in which is rotatably mounted a sleeve 26 provided at its upper end with an arm 27. To the lower end of the sleeve 26 is secured a worm wheel 28 which meshes with a worm 29 secured to the shaft of a synchromotor 31 mounted on the under surface of the base plate 25. Slidably mounted on the arm 27 is a carriage 32 thru which is threaded a screw shaft 33 having bearings in brackets 34 and 35 attached to the arm 27. The shaft 33 is driven by a synchro-motor 36 which is mounted on bracket 35. Rotatably mounted in brackets 35 and 37 is a square shaft 38 to one end of which is secured a bevel pinion 39 meshing with a bevel gear 41 which in turn is secured to a shaft 42 rotatably mounted in sleeve 26. To the lower end of shaft 42 is attached a worm wheel 43 which meshes with a worm 44 fastened on the shaft of a synchro-motor 45 which is mounted on the under side of base plate 25.

Figure 2:
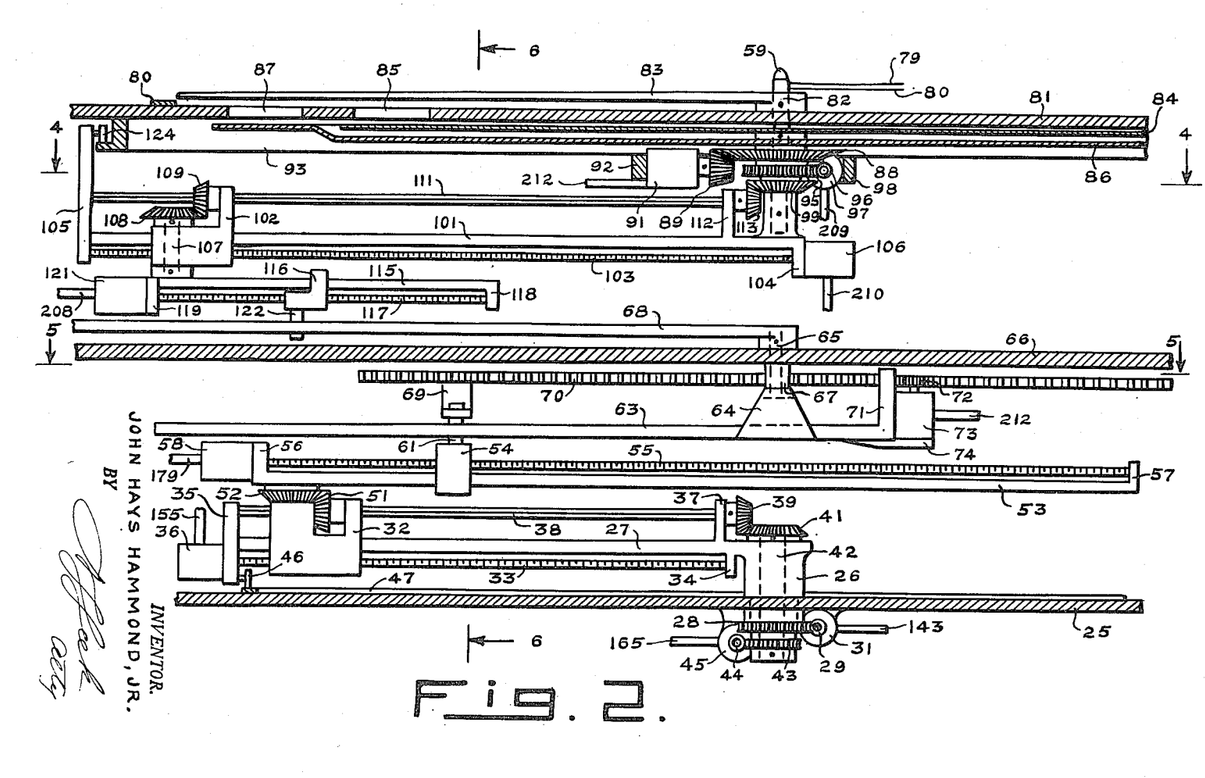
Fig. 2 is a side elevation, partly in section, of the calculator.

For carrying the weight of the arm 27, carriage 32, etc., a roller 46 is attached to the bracket 35 and rides on a circular track 47 mounted on the base plate 25. Slidably but not rotatably mounted on the square shaft 38 is a bevel pinion 51 meshing with a bevel gear 52 which is mounted for rotation on the carriage 32. Secured to the bevel gear 52 is an arm 53 on which a slider 54 is mounted. Threaded thru the slider 54 is a screw shaft 55 mounted for rotation in brackets 56 and 57 and driven by synchro-motor 58 which is mounted on bracket 56.

On top of the slider 54 is mounted pin 61 which slides in a slot 62 in an arm 63 which is provided with a bracket 64 to which is secured a shaft 65. This shaft is rotatably mounted in a middle plate 66 and is surrounded by a spacing collar 67. Secured to the shaft 65 is an arm 68. The pin 61 is pivotably mounted in a bracket 69 which is attached to a rack 70. This rack is slidably mounted in a bracket 71 which forms part of the arm 63 and meshes with a pinion 72 secured to the shaft of a synchro-generator 73 mounted on bracket 74 secured to arm 63. Mounted on the bracket 71 are two spring contacts 75 and 76 separated by a block of insulation 77. Attached to the rack 69 is a button 78 which at suitable times engages contact 75 to move it into engagement with contact 76. The contacts 75 and 76 are connected by two conductors 79 and 80 to a lamp 59 mounted on the arm 83. A battery 60 is inserted in the conductor 79.

Figure 3:
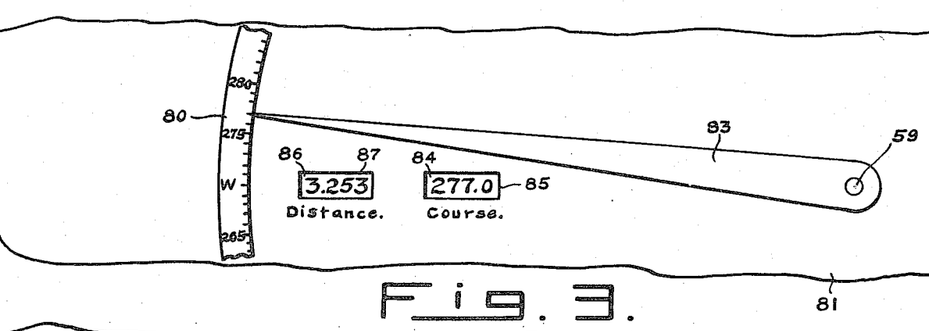
Fig. 3 is a top plan view of the calculator.
Figure 4:
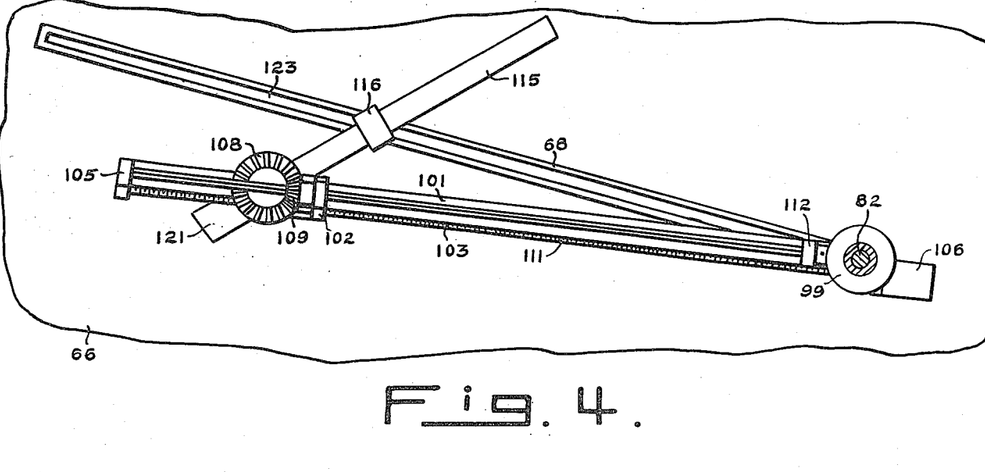
Fig. 4 is a horizontal section taken on line 4—4 of Fig. 2.

The calculator is provided with a top plate 81 in which is rotatably mounted a shaft 82 to the upper end of which is secured a pointer 83 which registers with a circular scale 80 graduated in degrees. Attached to the shaft 82 just below the plate 81 is a circular disc 84 engraved with the degrees of a circle 0° to 360°. These markings may be seen through a rectangular opening 85 in the plate 81 as shown in Fig. 3. Rotatably mounted on the shaft 83 below the disc 84 is a second circular disc 86 engraved with figures representing the distance of the submarine from the helicopter. These figures may be seen through a second rectangular opening 87 in the plate 81. Rotatably mounted on shaft 82 but attached to the disc 86 is a bevel gear 88 which meshes with bevel opinion 89 secured to the shaft of a synchro-motor 91 which is mounted on a bracket 92 attached to circular L-shaped member 93 which is mounted on the under surface of the top plate 81.

Rotatably mounted on shaft 82 is a worm wheel 95 which meshes with a worm 96 secured to the shaft of a synchro-motor 97 mounted on a bracket 98 which is attached to the circular member 93. Rotatably mounted on shaft 82 and attached to worm wheel 95 is a bevel gear 99. Secured to the lower end of shaft 82 is an arm 101 on which slides a carriage 102 thru which is threaded a screw-shaft 103 having bearings in brackets 104 and 105 attached to arm 101. Screw-shaft 103 is operated by a synchro-motor 106 mounted on bracket 104. Rotatably mounted in carriage 102 is a shaft 107 which passes thru a slot provided in the arm 101. To the upper end of shaft 107 is attached a bevel gear 108 which meshes with a bevel pinion 109. The pinion 109 is slidably but rotatably mounted on a square shaft 111 having bearings in brackets 105 and 112 and passing thru an opening in carriage 102. Secured to one end of shaft 111 is a bevel pinion 113 which meshes with bevel gear 99.

Secured to the lower end of the shaft 107 is an arm 115 on which is slidably mounted a slider 116 thru which is threaded a screw-shaft 117 having bearings in brackets 118 and 119 attached to arm 115. The screw-shaft 117 is driven by a synchro-motor 121 which is mounted on bracket 119. The slider 116 is provided with a pin 122 which slides in a slot 123 provided in arm 68. Mounted on the bracket 105 is a roller 124 which rolls on L-shaped member 93 and supports the weight of the arms 101, 115, etc. The entire calculator is enclosed in a casing 126 to which are secured the base plate 25, the middle plate 66 and the top plate 81.

Figure 7:
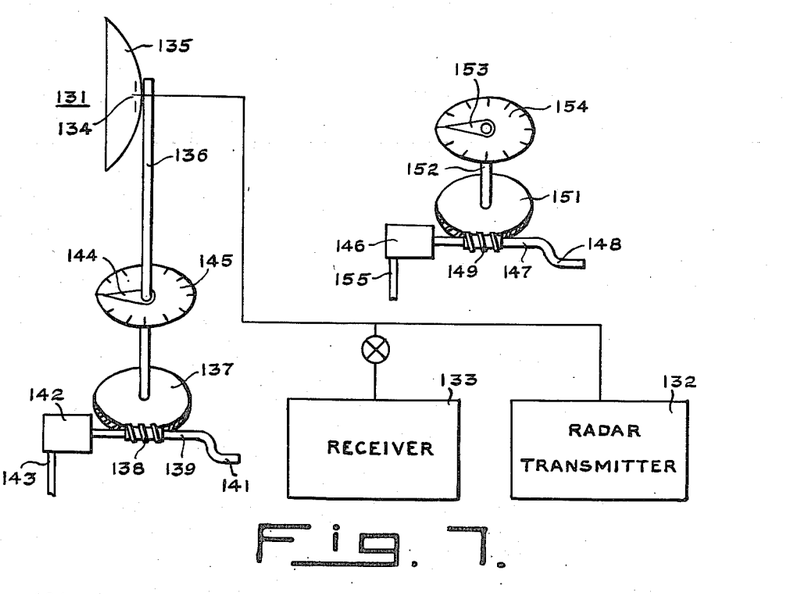
Fig. 7 is a diagrammatic view of the radar equipment used in connection with the invention.

In order to obtain the distance and bearing of the helicopter 13 from the ship 11 the radar system shown in Fig. 7 may be used. This may comprise a radar antenna 131, a radar transmitter 132 and a receiver 133, which may be any well known and standard construction such as that described in "Principles of Radar" published by McGraw-Hill Book Co. in 1946. The antenna 131 comprises a dipole 134 mounted at the focus of a parabolic reflector 135 which is secured to the upper end of a rotatable shaft 136 to the lower end of which is attached a worm wheel 137 meshing with a worm 138 carried on a shaft 139. At one end of the shaft 139 is a handle 141 and at the other end a synchro-generator 142 which is connected by a cable 143 to the synchro-motor 31 (Fig. 2). A pointer 144, attached to the shaft 136, indicates on a fixed dial 145 the bearing of the helicopter 13 from the ship 11.

The distance of the helicopter from the ship is determined in a well known manner from the receiver 133. For transmitting this distance to the calculator a synchro-generator 146 is provided which is driven by a shaft 147 provided with a handle 148. Secured on the shaft 147 is a worm 149 which meshes with a worm wheel 151 carried on the lower end of a shaft 152 to the upper end of which is attached a pointer 153 registering with a fixed dial 154. The generator 146 is connected by a cable 155 to the motor 36.

Figure 8:
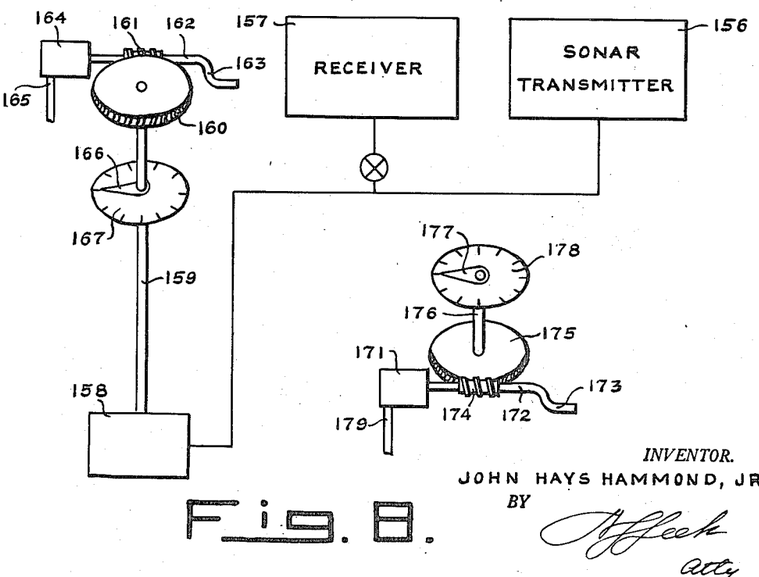
Fig. 8 is a diagrammatic view of the sonar equipment used in connection with the invention.

In order to obtain the distance and bearing of the submarine 12 from the ship 11 the sonar system depicted in Fig. 8 may be used. This may comprise a sonar transmitter 156, a receiver 157 and an array of quartz crystal subaqueous directional transducers indicated at 158 and attached to the lower end of a shaft 159. These may be of the general type described in articles in the RCA Review, vol. VIII, chapter entitled "Underwater sound transducers," pp. 698–718, and vol. X, chapter entitled "Directional microphone," pp. 339–347. The directional transducers 158 are attached to the lower end of a shaft 159 to the upper end of which is secured a worm wheel 160 meshing with a worm 161 carried on a shaft 162. At one end of this shaft is a handle 163 and at the other end a synchro-generator 164 which is connected by a cable 165 to the motor 45 (Fig. 2). A pointer 166, attached to the shaft 158, indicates on a fixed dial 167 the bearing of the submarine 12 from the ship 11.

The distance of the submarine from the ship is determined in a well known manner from the receiver 157. For transmitting this distance to the calculator a synchro-generator 171 is provided which is driven by a shaft 172 having a handle 173. Secured to the shaft 172 is a worm 174 which meshes with a worm wheel 175 carried on the lower end of a shaft 176 to the upper end of which is attached a pointer 177 registering with a fixed dial 178. The generator 171 is connected by a cable 179 to the motor 58.

Figure 9:
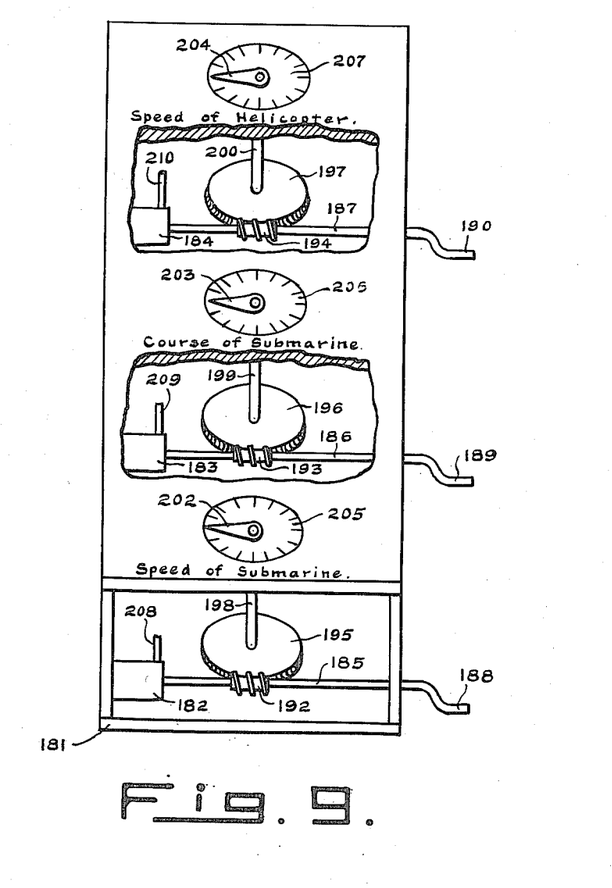
Fig. 9 is a perspective view of a mechanism for transmitting certain information to the calculator.

The course and speed of the submarine is determined in a well known manner by plotting the consecutive positions of the submarine as determined by sonar, as previously described. For transmitting this information, together with the speed of the helicopter, the mechanism depicted in Fig. 9 is used. This consists of a casing 181 in which are mounted three synchro-generators 182, 183 and 184 which are driven by three shafts 185, 186, and 187 and are provided with handles 188, 189 and 190. Fastened to these shafts are three worms 192, 193 and 194 which mesh with three worm wheels 195, 196 and 197 secured to three shafts 198, 199 and 200. To the other ends of these shafts are attached three pointers 202, 203 and 204 which register with three dials 205, 206 and 207 mounted on the top of casing 181. The three generators 182, 183 and 184 are connected by three cables 208, 209 and 210 to motors 97, 121 and 106 respectively. The generator 73 is connected by a cable 212 to the motor 91. The synchro-generators and motors referred to in this description may be of any suitable type, such for example as that described in "Principles of Radar," published by McGraw-Hill Book Co., chapter VIII, section A—Synchros, pp. 12-2 to 12-15.

Figure 10:
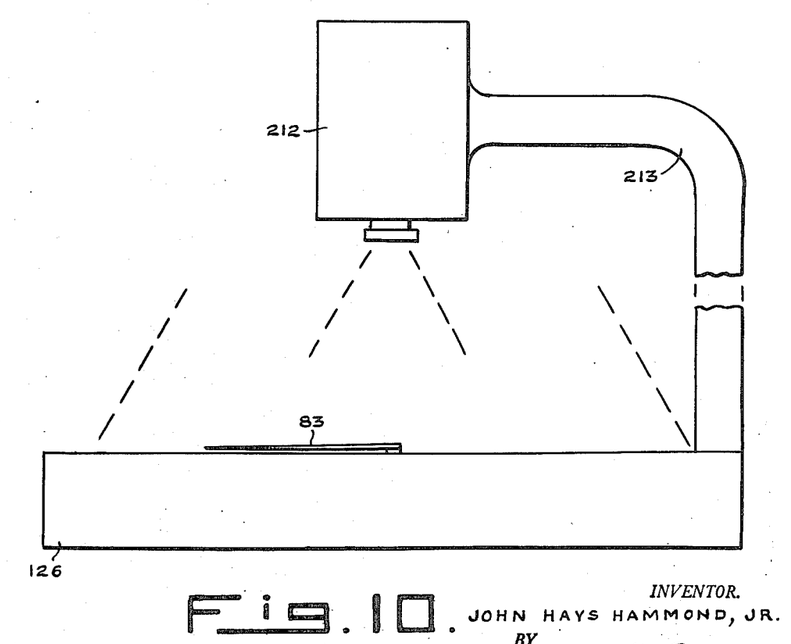
Fig. 10 is a side elevation of the calculator and television camera.
Figure 11:
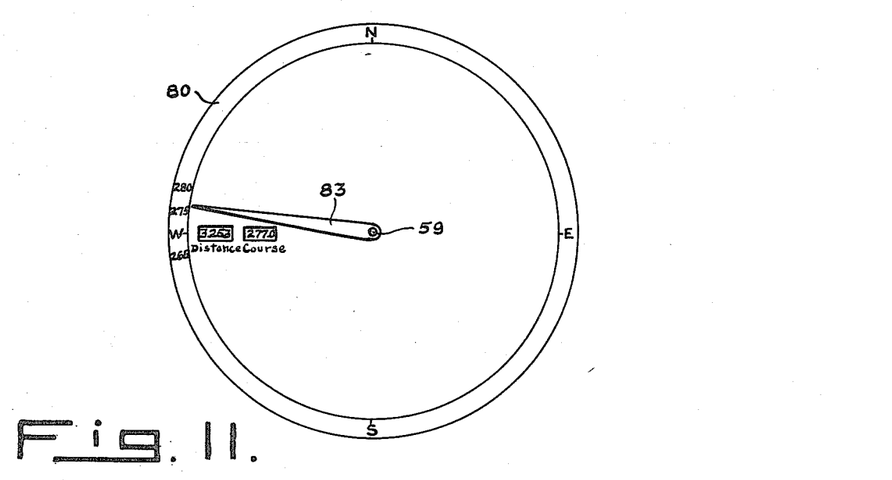
Fig. 11 is a front view of the television screen located in the aircraft.

For transmitting the information obtained by the calculator to the pilot of the helicopter a television camera 212 is mounted on a bracket 213 and is located a suitable distance above the dial of the calculator. The bracket 213 may be attached to the casing 126 of the calculator or supported in any desired manner. The camera 212 is connected to a television transmitter (not shown) which transmits the television picture to the receiver (not shown) in the helicopter where a picture of the calculator dial is reproduced on the television screen located on the instrument panel of the helicopter as depicted in Fig. 11. The television camera, transmitter, receiver, etc., may be of any well known and standard construction.

*Operation*

Figure 5:
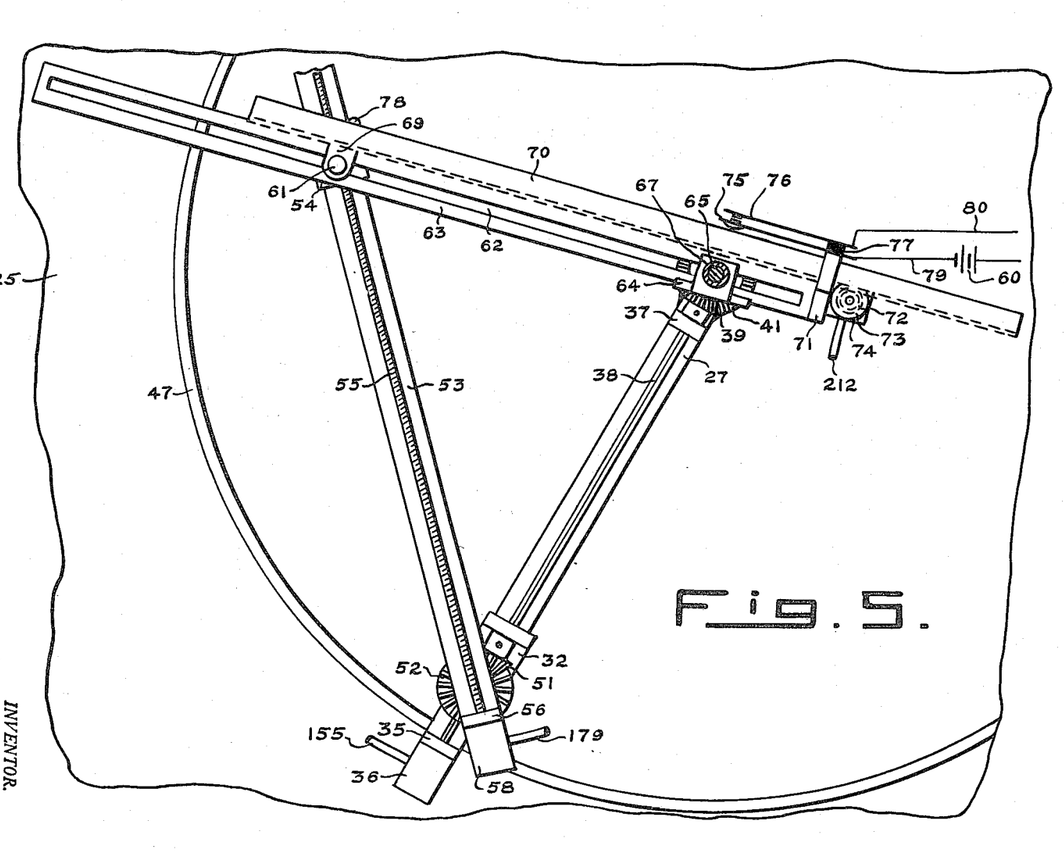
Fig. 5 is a horizontal section taken on line 5—5 of Fig. 2.
Figure 6:
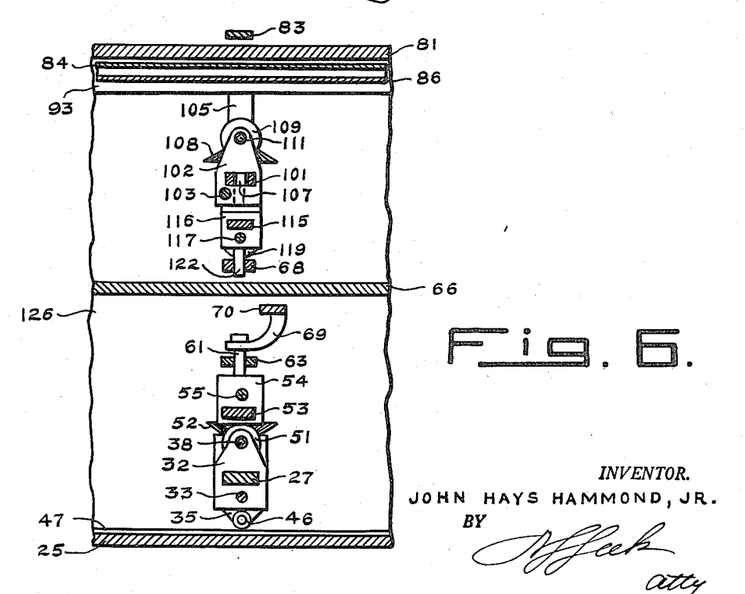
Fig. 6 is a vertical section taken on line 6—6 of Fig. 2.

It is first necessary to obtain the direction of the helicopter 13 from the ship 11, represented by the line 15 (Fig. 1). This is done in a well known manner by turning the handle 141 (Fig. 7) which rotates the directional radar antenna 131 by means of the worm and wheel 138—137, until the desired signal, received by reflection from the helicopter 13, is picked up. The direction of the line 15 is then indicated by the pointer 144 on the dial 145. This angle is given in degrees from north and in this figure is shown as being 30°. As the position of the helicopter is used as the center point of the calculator the angle to be fed to this machine is the direction of the line 15 from the helicopter 13 to the ship 11, which in this case is 30° plus 180°=210°. This angle is transmitted by the generator 146 through cable 143 to motor 31 (Fig. 2), which by means of worm and wheel 29—28 rotates sleeve 26 and therefore arm 27, to the position 210° as shown in Fig. 5.

The distance of the helicopter 13 from the ship 11, represented by the length of the line 15, is determined in a well known manner from the radar receiver 133 and is transmitted by turning the handle 148 to operate the generator 146 until the pointer 153 indicates the desired distance on the dial 154. The generator 146 transmits the motion thru the cable 155 to the motor 36, which rotates screw shaft 33, causing the carriage 32 to slide along the arm 27 until the distance between the axis of the sleeve 26 and the bevel gear 52 is equal to the distance between the helicopter 13 and ship 11, on the scale of the calculator.

It is now necessary to determine the direction and distance of the submarine 12 from the ship 11 which is done in a well known manner by turning the handle 163 (Fig. 8) which rotates the directional sonar transducers 158 until the desired signal, received by reflection from the submarine, is picked up. The direction of the line 14 is then indicated on the dial 167 by pointer 166. This angle is given in degrees from north and in this figure is shown as being 345°. This angle is transmitted by generator 164 to motor 45, which by means of worm and wheel 44—43 rotates shaft 42, which by means of bevel gear and pinion 41—31 rotates square shaft 38. This in turn by means of bevel pinion and gear 51—52 rotates arm 53 to the 345° position as shown in Fig. 5.

This distance of the submarine 12 from the ship 11, represented by the length of the line 14, is determined in a well known manner from the sonar receiver 157 and is transmitted by turning the handle 173 to operate the generator 171 until the pointer 177 indicates the desired distance on the dial 178. The generator 171 transmits this motion thru the cable 179 to the motor 58, which rotates screw shaft 55, causing the slider 54 to move along the arm 53 until the distance between the axis of the gear 52 and the pin 61 is equal to the distance between the ship 11 and submarine 12 on the scale of the calculator.

As the arms 27 and 53 and the slides 32 and 54 are moved into the positions shown in Fig. 5 the pin 61 will slide in the slot 62 causing the arm 63 to assume the position shown which in this case is 285°. This is the third side of the triangle 11—12—13, represented by line 17 (Fig. 1) and gives the desired bearing of the submarine 12 from the helicopter 13. The distance between the axis of the shaft 65 and pin 61 represents the calculated distance between the helicopter 13 and the submarine 12 on the scale of the calculator. As the pin 61 slides in the slot 62 it moves the rack 69 with it, which in turn rotates pinion 72 and generator 73. This rotation is proportional to the length of line 17 and is transmitted by cable 212 to motor 91 which by means of gears 89—88 rotates disc 86 an amount proportional to this distance. As this disc rotates the figures engraved thereon will appear in the opening 87 thus indicating the distance in miles between the helicopter 13 and the submarine 12.

The arm 63 and, therefore, the arm 68 will indicate the bearing of the submarine from the helicopter, but if the submarine is in motion it will be necessary to take that into account in order to determine the course which the helicopter must fly in order to intercept the submarine. The course and speed of the submarine is determined in any well known manner, such as plotting the locations of the submarine at given time intervals, as determined by the sonar apparatus just described.

After these factors have been obtained the velocity triangle 12—13—21 (Fig. 1) is determined in which the speed and course of the submarine 12 is represented by the line 18. In this case the speed is shown as 14 miles per hour (scale 1"=16 miles per hour) and the course as 240°. The angle 22 is now determined as 135° (240—(285—180). The air speed of the helicopter 13 is known, in this case being 70 miles per hour and is represented as the length of the line 19. With the lengths of the two sides 18 and 19 and the angle 22 known the triangle 12—13—21 is determined.

This information is transmitted to the calculator by turning the handle 188 (Fig. 9) until the pointer 202 indicates the speed of the submarine on the dial 205. This operation causes a rotation of the generator 182, which is transmitted through the cable 208 to motor 121, which in turn rotates the screw-shaft 117. This causes the rider 116 to slide along the arm 115 a distance proportional to the speed of the submarine.

The speed of the helicopter is transmitted by turning the handle 190 until the pointer 204 indicates this speed on the dial 207. This operation causes a rotation of the generator 184, which is transmitted through the cable 210 to motor 106, which in turn rotates the screw-shaft 103. This causes the rider 102 to slide along the arm 101 a distance proportional to the speed of the helicopter.

The course of the submarine is transmitted by turning handle 189 until the pointer 203 indicates this course on the dial 206. This operation causes a rotation of the generator 183, which is transmitted through cable 209 to motor 97, which in turn rotates the worm and wheel 96—95. The rotation of worm wheel 95 causes an equal rotation of bevel gear 99, which in turn causes a rotation of bevel pinion 89. This rotates the square shaft 111 causing a rotation of bevel pinion 109 and bevel gear 108. The rotation of gear 108 is transmitted by shaft 107 to the arm 115 which assumes the position shown in Fig. 4 corresponding to the course of the submarine as indicated by the line 18 of Fig. 1. The angle between the arms 68 and 115 will now equal the angle 22 and the arm 101 will assume the direction of the line 19, which is the course the helicopter must fly in order to intercept the submarine at the point 21, which in this case is 277°.

The position of the arm 101 is transmitted by the shaft 82 to the arm 83 which indicates the course angle 277° on the dial 80 (Fig. 3). At the same time the disc 84 is rotated by the shaft 82 so that the figures 277 appear in the opening 85. The top of the calculator is now televised by the television camera 212 (Fig. 10) which transmits this picture to the television receiver located in the helicopter where it is reproduced on the kinescope screen located on the instrument panel in front of the pilot as shown in Fig. 11.

The pilot of the helicopter now has a visual indication in front of him of the course he should fly to intercept the submarine. He not only sees the pointer 83 indicating the course on the dial 80, but he also sees this course given as degrees in large numerals in the opening 85. In the other opening 87 he is given the distance in miles from the helicopter to the submarine. As the helicopter approaches the submarine new values of the various bearings, distances, etc. will be obtained and fed to the calculator as already described, which will result in changes of the course and distance. These changes will be immediately seen by the pilot of the helicopter, as the top of the calculator is continuously televised by the camera 212. In this way the pilot can follow any changes in the course and speed of the submarine so as to be sure to intercept the submarine at the proper position. If there is a wind blowing at the time of the attack the pilot can solve the wind drift problem for aircraft in the usual and well known manner and apply the correction to his course and thereby obtain the proper heading for the helicopter.

When the helicopter reaches a position directly over the submarine the pin 61 will be directly under the shaft 65 and the rack 70 will have moved sufficiently far to the right, as seen in Fig. 5, so that the button 78 will raise the contact 75 causing it to engage the contact 76 thereby closing a circuit to the light 59 which will be lit by battery 60. This will indicate to the pilot that he is directly over the submarine and should drop his depth bombs.

Although only a specific embodiment of this invention has been shown herein, it is to be understood that the invention may be embodied in various forms as will be readily apparent to a person skilled in the art.

What is claimed is:

1. A computer mechanism for computing the bearing of a target point for an attacking vessel to intercept a target vessel and the distance of the target vessel from the attacking vessel, by data with respect to a remote observation point, comprising a lower support, a sleeve rotatably mounted therein and carrying a radial arm, means rotating said sleeve to set the position of said arm in accordance with the bearing of the observation point from said attacking vessel, a rider on said arm, means including a repeater and a worm feed driven thereby for setting said rider along said arm in accordance with the distance of said attacking vessel from said observation point, a second arm pivoted on said rider, means including a repeater and gears to set said second arm in accordance with the bearing of the target vessel from said observation point, a rider on said second arm, means including a repeater and a worm feed driven thereby to set said last rider in accordance with the distance of the target vessel from said observation point, a second support above said first support, a third arm rotatably mounted below said second support about an axis common with that of said sleeve, a sliding connection between said last rider and said third arm, a repeater on said third arm, means including a rack and pinion connecting said last rider to actuate said last repeater to transmit the distance of said attacking vessel from said target vessel, a fourth arm connected to said third arm and rotatable above said second support, a third support above said second support, a fifth arm rotatably mounted below said third support, a rider on said fifth arm, means including a repeater and a worm feed driven thereby to set said last rider in accordance with the speed of the attacking vessel, a sixth arm pivoted to said last rider, means including a repeater to set said sixth arm in accordance with the course of the target vessel, a rider on said sixth arm having a sliding connection with said fourth arm, means including a repeater and a worm feed driven thereby to set said last rider in accordance with the speed of the target vessel, whereby said fourth, fifth and sixth arms form a triangle in which the position of the fifth arm represents the bearing of the target point from the attacking vessel.

2. In a computer, as set forth in claim 1, a pointer attached to said fifth arm above said third support and a scale on said third support cooperating with said pointer to indicate the bearing of said target point.

3. In a computer, as set forth in claim 1, signal means actuated when said second rider reaches a position in alignment with said axis, to indicate that the attacking vessel is over said target vessel.

References Cited in the file of this patent

UNITED STATES PATENTS

| Number | Name | Date |
|---|---|---|
| 2,370,753 | Reece | Mar. 6, 1945 |
| 2,432,625 | Klein | Dec. 16, 1947 |
| 2,437,243 | Curtis | Mar. 9, 1948 |
| 2,438,522 | Smith | Mar. 30, 1948 |
| 2,480,868 | Marshall | Sept. 6, 1949 |
| 2,513,490 | Jones | July 4, 1950 |

FOREIGN PATENTS

| Number | Country | Date |
|---|---|---|
| 725,817 | Germany | Sept. 30, 1942 |